(12) United States Patent
Momose et al.

(10) Patent No.: US 11,829,817 B2
(45) Date of Patent: Nov. 28, 2023

(54) CARD READER AND CONTROL METHOD THEREFOR

(71) Applicant: NIDEC SANKYO CORPORATION, Nagano (JP)

(72) Inventors: Munemasa Momose, Nagano (JP); Jo Tanaka, Nagano (JP)

(73) Assignee: NIDEC SANKYO CORPORATION, Nagano (JP)

(*) Notice: Subject to any disclaimer, the term of this patent is extended or adjusted under 35 U.S.C. 154(b) by 0 days.

(21) Appl. No.: 17/880,662

(22) Filed: Aug. 4, 2022

(65) Prior Publication Data

US 2023/0059789 A1    Feb. 23, 2023

(30) Foreign Application Priority Data

Aug. 17, 2021   (JP) ................................. 2021-132877

(51) Int. Cl.
*G06K 13/08* (2006.01)
*G06K 13/073* (2006.01)

(52) U.S. Cl.
CPC ....... *G06K 13/0862* (2013.01); *G06K 13/073* (2013.01); *G06K 2207/1016* (2013.01)

(58) Field of Classification Search
CPC ............. G06K 13/0862; G06K 13/073; G06K 2207/1016
USPC ....................................................... 235/475
See application file for complete search history.

(56) References Cited

U.S. PATENT DOCUMENTS

| 4,810,014 | A | * | 3/1989 | McGourty | .......... E05B 47/0012 292/144 |
| 10,049,311 | B2 | * | 8/2018 | Kuwaki | ............... G06K 7/0056 |
| 2013/0067969 | A1 | * | 3/2013 | Webb | ...................... E05B 47/00 70/78 |
| 2013/0298616 | A1 | * | 11/2013 | Ullrich | ................ E05B 47/0012 70/278.1 |
| 2018/0073275 | A1 | * | 3/2018 | Ullrich | ............... G07C 9/00182 |
| 2023/0035982 | A1 | * | 2/2023 | Mizawa | ............... G06K 7/0069 |

FOREIGN PATENT DOCUMENTS

JP        2016224830        12/2016

* cited by examiner

*Primary Examiner* — Michael G Lee
*Assistant Examiner* — David Tardif
(74) *Attorney, Agent, or Firm* — JCIPRNET

(57) ABSTRACT

A card reader includes a card lock mechanism for preventing pulling-out of a card from an insertion port when the card is jammed in a conveyance passage. The card lock mechanism includes a motor, a lock member driven by the motor to be moved between a contact position and a retreated position, a knob mechanically connected with the motor, and a detection mechanism for detecting the lock member located at the retreated position. The card reader includes a control part which is configured so that, after the motor is driven to move the lock member to the contact position, when the detection mechanism detects that the lock member has moved to the retreated position, the control part executes a tactile stimulation sequence in which the motor is driven to apply movement to the knob so that attention of an operator operating the knob is called in a tactile manner.

15 Claims, 5 Drawing Sheets

(a) Contact State    (b) Retreated State

CARD READER AND CONTROL METHOD THEREFOR

CROSS REFERENCE TO RELATED APPLICATION

The present invention claims priority under 35 U.S.C. § 119 to Japanese Application No. 2021-132877 filed Aug. 17, 2021, the entire content of which is incorporated herein by reference.

TECHNICAL FIELD

At least an embodiment of the disclosure may relate to a card reader including a card lock mechanism and a control method therefor.

BACKGROUND

A card reader which performs reading of data recorded in a card and writing of data to the card is, for example, incorporated in a host apparatus such as an automated teller machine and is used widely. A card reader has been exposed to a threat such as a crime trying to steal a card itself or information recorded in the card. As such a crime, so-called fishing has been known in which a jam of a card is intentionally occurred in an inside of a card reader to make the card remain in the inside of the card reader and, after that, a criminal illegally pulls out the card from the card reader. As a technique for preventing the fishing, for example, a conventional card lock mechanism is provided in a card reader in order to prevent illegal pulling-out of a card from the card reader. The card lock mechanism includes a motor, a lock member which is provided with a blocking pawl which is contacted with a card to prevent pulling-out of the card and is moved between a contact position where the blocking pawl is contacted with the card and a retreated position where the blocking pawl is retreated from a card conveyance passage by power transmitted from the motor, and a power transmission mechanism which transmits power of the motor to the lock member. The lock member is driven by the motor to be moved between the contact position and the retreated position. When maintenance of a host apparatus is to be performed, or when a normal operator tries to take out a card which is jammed in the card reader, there may occur that a lock state of the card by the lock member is required to be released. In preparation for such a case, the conventional card lock mechanism is structured so that a rotatable knob which is mechanically connected with a drive shaft (output shaft) of a motor is provided and the lock member is capable of being also moved to the retreated position by rotating the knob by a finger. Further, the conventional card lock mechanism includes a sensor for detecting the lock member located at the retreated position.

In the conventional card lock mechanism, the lock member can be moved by rotating the knob by a finger to set the lock member to the retreated position. However, when the knob is excessively rotated, the lock member and the motor may be damaged.

SUMMARY

According to an exemplary embodiment of the disclosure, there may be provided a card reader including an insertion port where a card is inserted and ejected, a conveyance passage where the card inserted from the insertion port is conveyed, and a card lock mechanism structured to prevent pulling-out of the card from the insertion port when the card is jammed in the conveyance passage. The card lock mechanism includes a motor, a lock member which is provided with a blocking pawl structured to contact with the card and prevent pulling-out of the card and is driven by the motor to be moved between a contact position where the blocking pawl is contacted with the card and a retreated position where the blocking pawl is retreated from the conveyance passage, a knob mechanically connected with an output shaft of the motor, and a detection mechanism structured to detect the lock member located at the retreated position. The card reader includes a control part which controls a position of the lock member by driving the motor, and the control part is configured so that, after the control part performs first control in which the motor is driven to move the lock member to the contact position, when the detection mechanism detects that the lock member has moved to the retreated position, the control part executes a tactile stimulation sequence in which the motor is driven to apply movement to the knob so that attention of an operator operating the knob is called in a tactile manner.

According to another exemplary embodiment of the disclosure, there may be provided a control method for a card reader. The card reader includes an insertion port where a card is inserted and ejected, a conveyance passage where the card inserted from the insertion port is conveyed, and a card lock mechanism structured to prevent pulling-out of the card from the insertion port when the card is jammed in the conveyance passage. The card lock mechanism includes a motor, a lock member which is provided with a blocking pawl structured to contact with the card and prevent pulling-out of the card and is driven by the motor to be moved between a contact position where the blocking pawl is contacted with the card and a retreated position where the blocking pawl is retreated from the conveyance passage, and a knob mechanically connected with an output shaft of the motor. The control method includes performing first control in which the motor is driven so that the lock member is moved to the contact position and, after that, when it is detected that the lock member has moved to the retreated position, executing a tactile stimulation sequence in which movement is applied to the knob by driving the motor to call attention of an operator operating the knob in a tactile manner.

The above and other elements, features, steps, characteristics and advantages of the present disclosure will become more apparent from the following detailed description of the preferred embodiments with reference to the attached drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Figure 1:
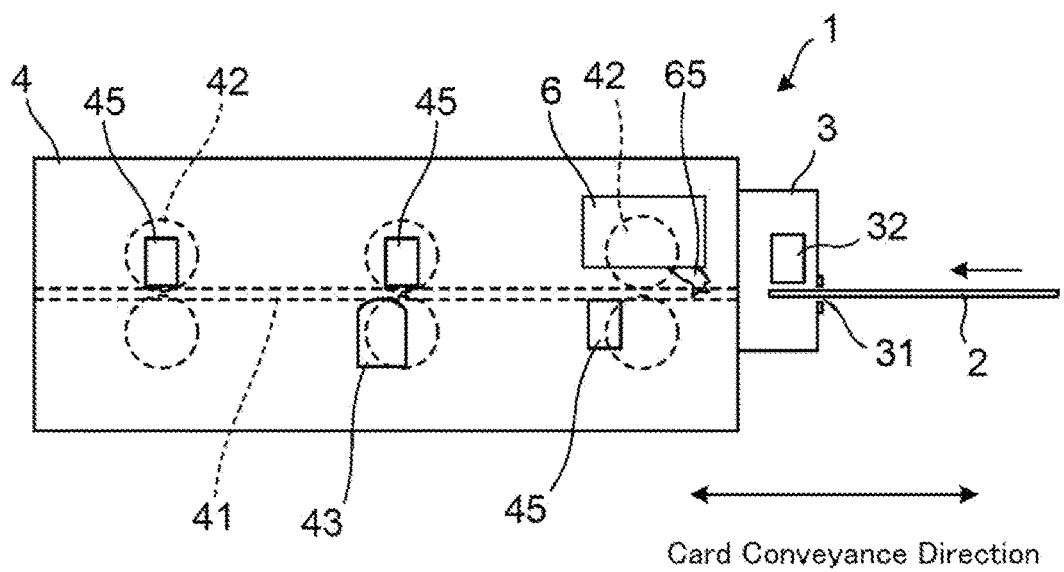
FIG. 1 is a schematic cross-sectional view showing a schematic structure of a card reader in accordance with an embodiment of the disclosure.

An embodiment of the disclosure will be described below with reference to the accompanying drawings. FIG. 1 is a schematic cross-sectional view showing a schematic structure of a card reader in accordance with an embodiment of the disclosure. A card reader 1 shown in FIG. 1 is a card reader in which various processings including at least one of reading and writing of data are performed on a card 2 which is a magnetic card or an IC card. A mechanical structure of the card reader 1 is similarly structured to a conventional card reader and is, for example, incorporated in a host apparatus such as an automated teller machine.

The card reader 1 includes an insertion part 3 into which the card 2 is inserted by a user, and a main body part 4 which is connected with the insertion part 3 and in which the card 2 inserted into the insertion part 3 is taken into the inside to perform various processings on the card 2. The insertion part 3 is provided with an insertion port 31 which is an opening into which the card 2 is inserted and from which the card 2 is ejected and, in addition, the insertion part 3 is attached with an insertion detection sensor 32 which detects whether the card 2 is inserted into the insertion part 3 through the insertion port 31 or not. The insertion detection sensor 32 may be structured, for example, so as to detect the card 2 having been inserted by shading an optical path between a light emitting part and a light receiving part by the card 2, or may be structured of another type of a sensor. An inside of the main body part 4 is provided with a conveyance passage 41 where the card 2 is conveyed when processing is to be performed on the card 2, conveyance rollers 42 provided along the conveyance passage 41 for conveying the card 2, a magnetic head 43 provided at a substantially center in a longitudinal direction of the conveyance passage 41, and a plurality of card detection sensors 45 provided along the conveyance passage 41 for detecting an object such as the card 2. The conveyance rollers 42 are driven by a conveyance motor 52 (see FIG. 6), and the conveyance rollers 42 are rotated through rotation of the conveyance motor 52 and thereby, the card 2 is conveyed in the right and left direction in FIG. 1 in the inside of the main body part 4. In the embodiment shown in FIG. 1, three pairs of the conveyance rollers 42 are provided, and three card detection sensors 45 are provided. As the card detection sensor 45, for example, an optical type sensor which detects an object by shading an optical path with the object may be utilized, or a capacitance type sensor which detects an object by detecting an electrostatic capacitance change may be utilized.

The main body part 4 further includes a card lock mechanism 6 which is disposed on an upper side with respect to the conveyance passage 41 for preventing pulling-out of the card 2 from the insertion port 31 when the card 2 is jammed in the conveyance passage 41. The card lock mechanism 6 prevents pulling-out of the card 2 from the insertion port 31, in addition to the case that the card 2 is jammed, even in a case that, for example, forcible opening of a shutter (not shown) provided in the insertion port 31 is detected, a forcible movement of the card 2 in the conveyance passage 41 operated from the outside is detected, an abnormal change in various sensors provided in the conveyance passage 41 and the like is detected, and the like. The card lock mechanism 6 includes a lock member 65 which is provided with a blocking pawl structured to contact with the card 2 by protruding to an inside of the conveyance passage 41 and prevent pulling-out of the card 2. The lock member 65 is provided so as to be capable of moving between a contact position where the blocking pawl is contacted with the card 2 and a retreated position where the blocking pawl is retreated from the conveyance passage 41. In FIG. 1, the lock member 65 is shown as it is located at the contact position.

Figure 2:
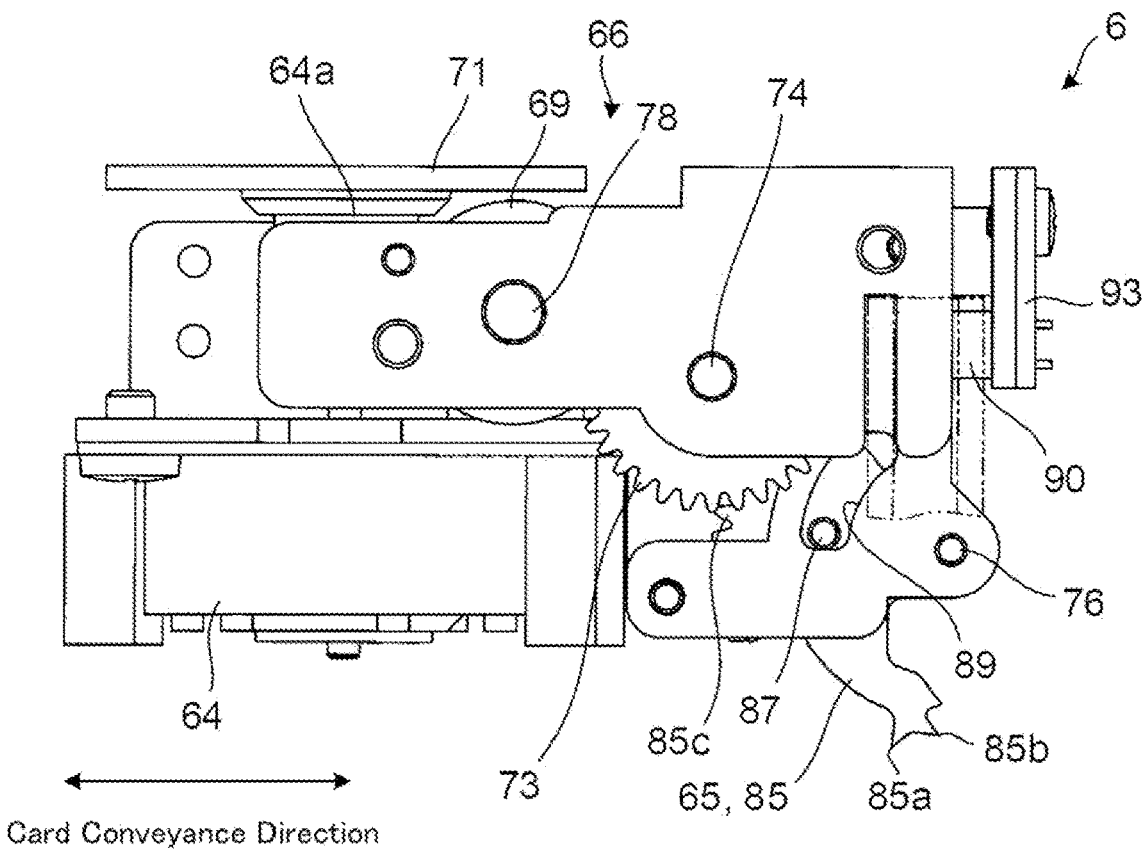
FIG. 2 is a side view showing a structure of a card lock mechanism.
Figure 3:
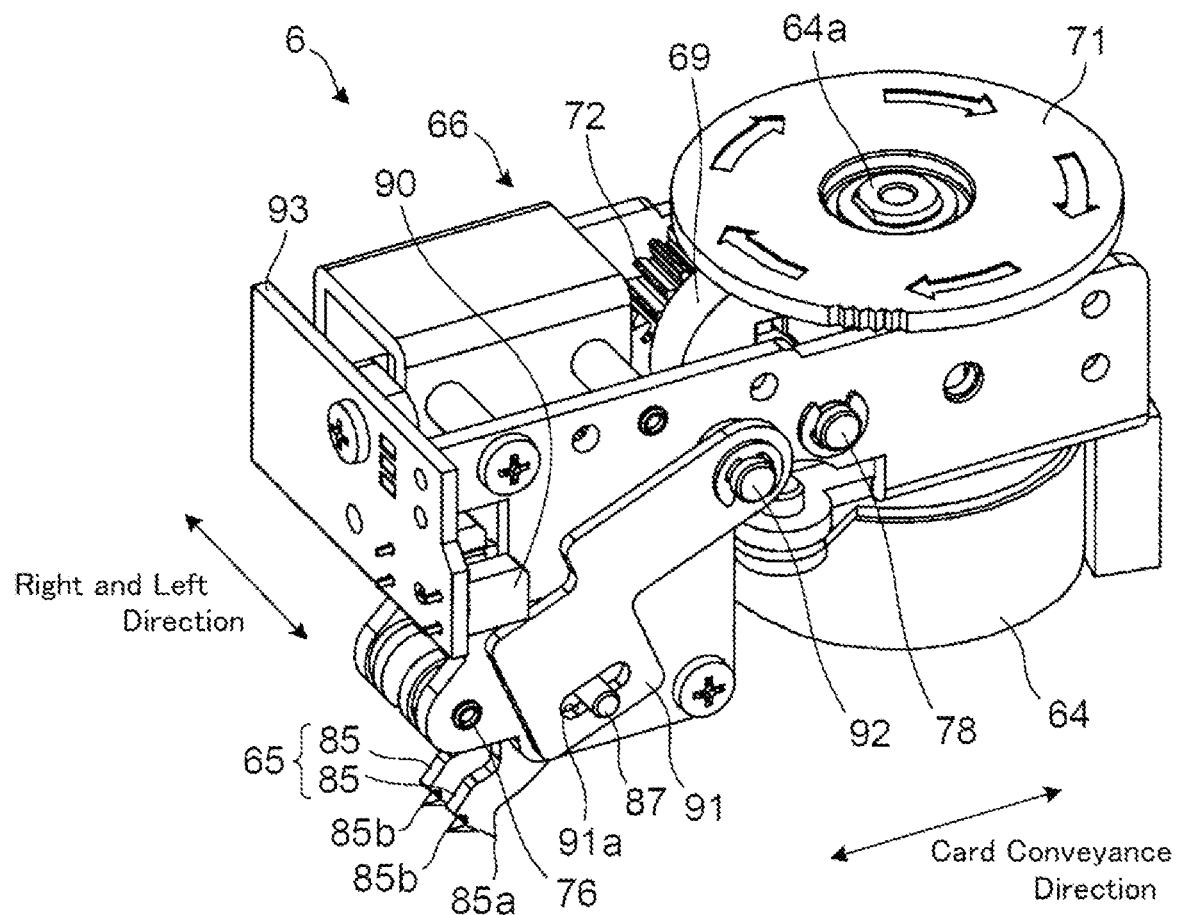
FIG. 3 is a perspective view showing a structure of a card lock mechanism.
Figure 4:
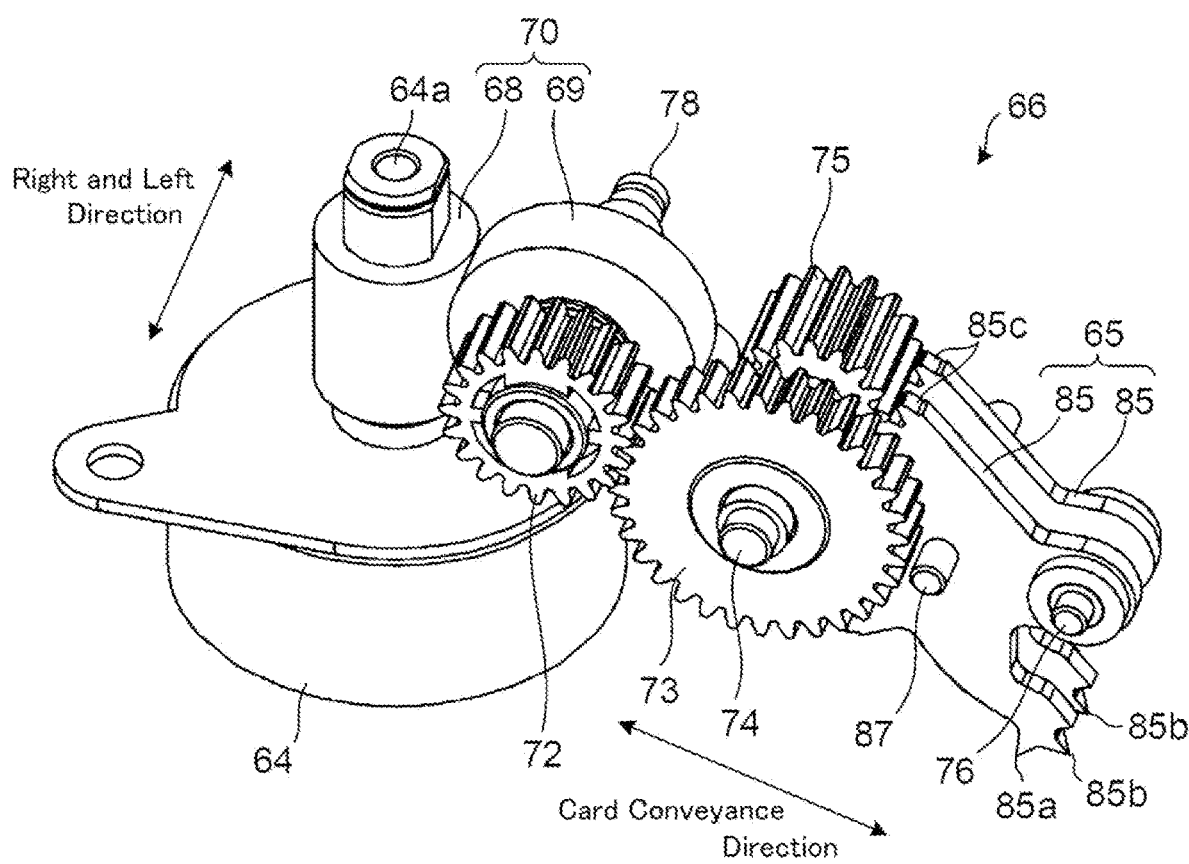
FIG. 4 is a perspective view showing a power transmission mechanism in a card lock mechanism.

The card lock mechanism 6 used in the card reader 1 in this embodiment has the same structure as a conventional card lock mechanism. Therefore, description of the card lock mechanism 6 used in the card reader 1 in this embodiment is omitted. FIG. 2 is a side view showing the card lock mechanism 6, FIG. 3 is a perspective view showing the card lock mechanism 6, and FIG. 4 is a perspective view showing a power transmission mechanism (drive transmission mechanism) 66 in the card lock mechanism 6. In FIG. 4, a knob 71 which is attached to a rotation shaft (output shaft) 64*a* of a motor 64 is not shown. Next, the card lock mechanism 6 will be described below. In the following descriptions, a right and left direction is a direction perpendicular to a conveyance direction of the card 2 on a conveyance plane of the card 2 in the conveyance passage 41, in other words, a width direction of the conveyance passage 41. A height direction is a direction perpendicular to the conveyance plane of the card 2 in the conveyance passage 41. Regarding a front end side (front side) and a rear side, a side which is near to the insertion port 31 along a conveyance direction of the card 2 is a front end side (front side), and a far side with respect to the insertion port 31 is a rear side.

The card lock mechanism 6 includes, in addition to the lock member 65, the motor 64 which drives the lock member 65 for moving the lock member 65 between the contact position and the retreated position, and a power transmission mechanism 66 which transmits power of the motor 64 to the lock member 65. The lock member 65 is structured of two lock plates 85 provided in a flat plate shape, and the two lock plates 85 are arranged in the right and left direction so that their thickness directions are directed in the right and left direction. Each of the lock plates 85 is provided with two blocking pawls 85*a* and 85*b* structured to contact with the card 2 and prevent pulling-out of the card 2 and is provided with a sector gear 85*c* which is engaged with a spur gear 75 described below.

A front end side portion of the lock plate 85 is turnably held by a fixed shaft 76 which is fixed to a support frame of the card lock mechanism 6 and is extended in the right and left direction. The blocking pawls 85*a* and 85*b* are provided on a lower end side of the lock plate 85 and is disposed on a rear side with respect to the fixed shaft 76. The blocking pawl 85*a* is disposed on a rear side with respect to the blocking pawl 85*b*. Each of the blocking pawls 85*a* and 85*b* is provided in a triangular shape whose width becomes narrow as going to its tip end side when viewed in the right and left direction and its tip end side is pointed. The sector gear 85*c* is provided on a rear end side of the lock plate 85. The lock member 65 is disposed on an upper side with respect to the conveyance passage 41 so that the blocking pawls 85*a* and 85*b* are contacted with the card 2 from an upper side. As described above, the lock member 65 is movable between the contact position where the blocking pawls 85*a* and 85*b* are contacted with the card 2 and the retreated position where the blocking pawls 85*a* and 85*b* are retreated from the conveyance passage 41 by driving the motor 64 through the power transmission mechanism 66. At the retreated position, the blocking pawls 85a and 85b are moved to an upper side with respect to the conveyance passage 41 and thus, the blocking pawls 85a and 85b are not contacted with the card 2.

Next, the power transmission mechanism 66 which transmits power from the motor 64 to the lock member 65 will be described below. The motor 64 is attached so that an axial direction of the output shaft 64a is directed in the height direction. The power transmission mechanism 66 includes a worm gear 70 which is structured of a screw gear 68 attached to the output shaft 64a of the motor 64 and a helical gear 69 engaged with the screw gear 68. The helical gear 69 is attached to a rotation shaft 78, and the rotation shaft 78 is extended in the right and left direction. A spur gear 72 is attached to the rotation shaft 78. A spur gear 73 is engaged with the spur gear 72. The spur gear 73 is attached to a rotation shaft 74 through a pin clutch (not shown). The rotation shaft 74 is also extended in the right and left direction, and the rotation shaft 74 is also attached with a spur gear 75 which is engaged with the sector gear 85c of the lock plate 85 described above. When such the drive transmission mechanism 66 is used, rotation of the motor 64 is transmitted to the rotation shaft 74 and is further transmitted to the sector gear 85c of the lock plate 85 through the spur gear 75 which is attached to the rotation shaft 74. As a result, the lock member 65 is turned with the fixed shaft 76 as a center according to a rotating direction of the motor 64, and the lock member 65 is moved from the retreated position to the contact position, or moved from the contact position to the retreated position. When the lock member 65 is moved to the contact position, the blocking pawls 85a and 85b are moved to a lower side and, when the lock member 65 is moved to the retreated position, the blocking pawls 85a and 85b are moved to an upper side.

The lock member 65 is fixed with guide pins 87 which are protruded to both sides in the right and left direction, and the guide pin 87 is engaged with a guide groove 89 provided in a frame of the card lock mechanism 6. The lock member 65 is guided by the guide groove 89 and the guide pin 87 and is moved between the contact position and the retreated position. As shown in FIG. 2, in a case that the lock member 65 is located at the contact position, the blocking pawl 85a is protruded toward a lower rear side and the blocking pawl 85b is protruded toward a lower front side. Each of the blocking pawls 85a and 85b is provided in a triangular shape so that its tip end is pointed and thus, when a pulling-out force to a front side is applied to the card 2 in a state that the blocking pawls 85a and 85b are contacted with the card 2, a turning force in a counterclockwise direction in FIG. 2 is generated in the lock member 65 and a tip end of the blocking pawl 85a is stuck into the card 2. On the other hand, in the state that the blocking pawls 85a and 85b are contacted with the card 2, when a pushing force to a rear side is applied to the card 2, a turning force in a clockwise direction in FIG. 2 is generated in the lock member 65 and a tip end of the blocking pawl 85b is stuck into the card 2. As a result, the card 2 which is jammed in the conveyance passage 41 is prevented from being pulled out from the insertion port 31. As described above, when once the lock member 65 has been moved to the contact position, after that, even when the motor 64 is not driven (in other words, even when torque is not generated), the state at the contact position is maintained and, either of the blocking pawls 85a and 85b is stuck into the card 2 according to a movement of the card 2 and thus, pulling-out of the card 2 through the insertion port 31 is prevented.

In addition, the card lock mechanism 6 includes a detection mechanism structured to detect that the lock member 65 is located at the retreated position. The detection mechanism is structured of a retreat detection sensor 90 and a shading member 91. The retreat detection sensor 90 is, for example, a transmission type optical sensor having a light emitting element and a light receiving element which receives light from the light emitting element, and the retreat detection sensor 90 is fixed to the support frame of the card lock mechanism 6 through a sensor board 93. The shading member 91 is a plate-shaped member and its thickness direction is coincided with the right and left direction and, in addition, the shading member 91 is turnably held by a fixed shaft 92 which is fixed to the support frame of the card lock mechanism 6 so as to move on a plane perpendicular to the right and left direction in conjunction with the lock member 65. The shading member 91 is provided with a cam groove 91a into which a tip end part of the guide pin 87 provided in the lock member 65 is inserted and thereby, the shading member 91 is moved in conjunction with the lock member 65. Specifically, when the lock member 65 is turned around the fixed shaft 76, the shading member 91 is turned with the fixed shaft 92 as a center. The retreat detection sensor 90 is provided so as to detect a part of a turning range of the shading member 91 and, when the lock member 65 is located at the retreated position, the shading member 91 shades light from the light emitting element of the retreat detection sensor 90 toward the light receiving element. In this manner, the card reader 1 is capable of detecting that the lock member 65 is located at the retreated position.

Figure 5:
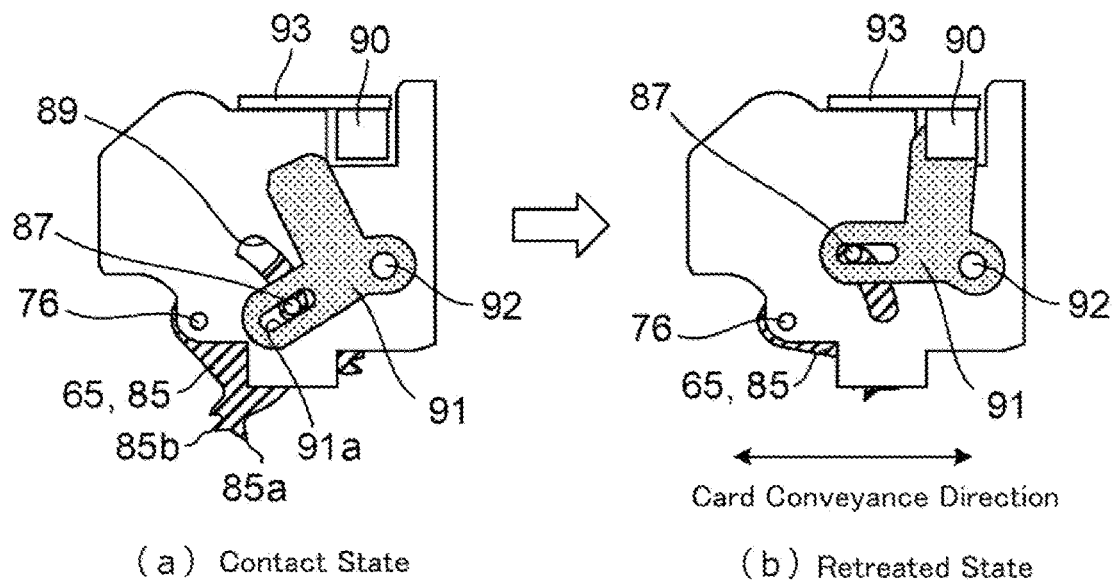
FIG. 5 is a view showing a movement of a lock member and a shading member.

FIG. 5 is a view for explaining detection whether the lock member 65 is located at the retreated position or not. In FIG. 5, a shape of the shading member 91 and an attaching position of the retreat detection sensor 90 in the support frame are different from those shown in FIGS. 2 through 4. However, a detection principle whether the shading member 91 is located at the retreated position or not shown in FIG. 5 is the same as that shown in FIGS. 2 through 4. In FIG. 5, as the lock member 65 is moved from the contact position to the retreated position by turning around the fixed shaft 76 in a counterclockwise direction, the shading member 91 is turned around the fixed shaft 92 in a clockwise direction and, as a result, a tip end part of the shading member 91 shades an optical path of the retreat detection sensor 90.

As shown in FIGS. 2 and 3, in the card lock mechanism 6, the knob 71 for manually turning the output shaft 64a of the motor 64 is fixed on an upper end side of the screw gear 68, and the knob 71 is mechanically connected with the output shaft 64a of the motor 64. In the card reader 1 in this embodiment, the lock member 65 of the card lock mechanism 6 is moved between the contact state and the retreated state by power transmitted from the motor 64. Therefore, the lock member 65 is able to be moved from the contact position to the retreated position by controlling the motor 64. However, in a case that, for example, the card 2 is jammed in the card reader 1 and a normal operator is going to take out the card 2, there may be a case that the lock member 65 is required to be manually moved to the retreated state. The knob 71 is provided for manually releasing the contact state of the lock member 65 to move to the retreated state and, when the knob 71 is rotated in a direction shown by the arrows engraved in the knob 71 by a finger, the rotation shaft 64a of the motor 64 is also rotated and the lock member 65 is set to be the retreated state.

Figure 6:
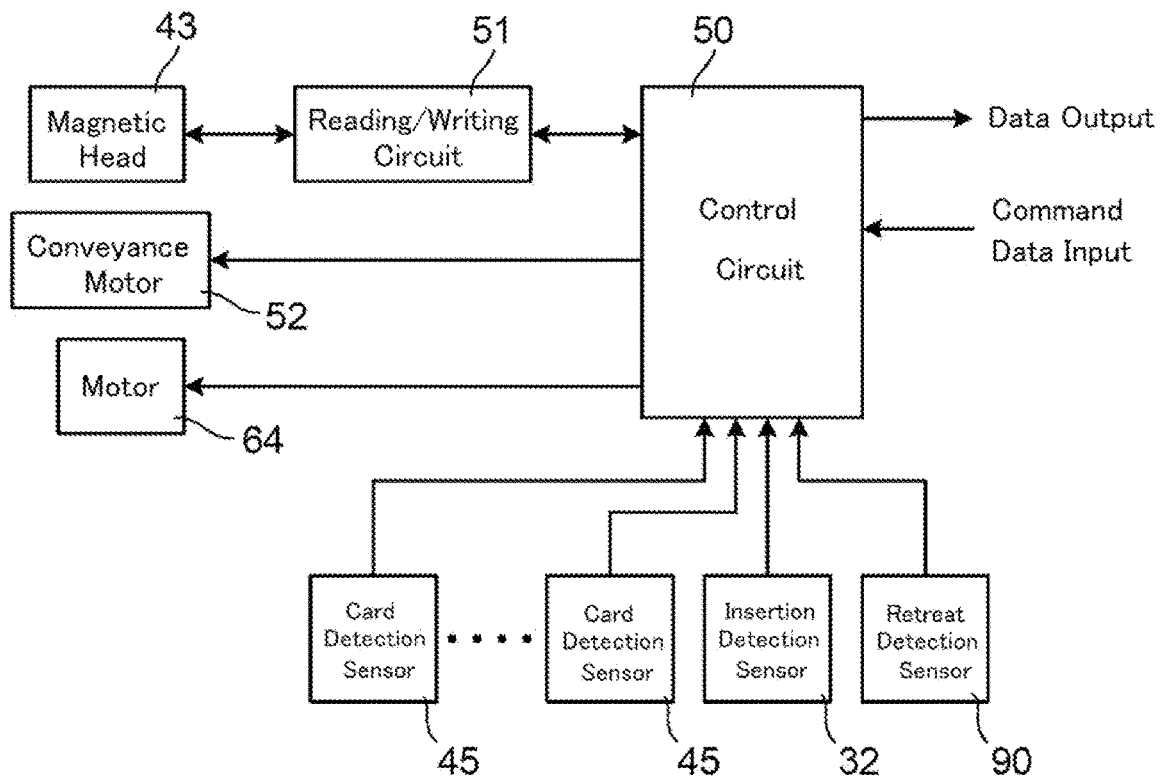
FIG. 6 is a block diagram showing a circuit configuration of a card reader.

FIG. 6 is a block diagram showing an electrical configuration of the card reader 1 in accordance with an embodiment of the disclosure. An electrical configuration of the card reader 1 includes a control circuit (control part) 50 which controls an operation of the card reader 1 and performs input and output of data with respect to a host apparatus, a reading and writing circuit 51 provided between the magnetic head 43 and the control circuit 50, and the conveyance motor 52 which drives the conveyance rollers 42. Commands from the host apparatus are also inputted to the control circuit 50. Detection outputs of the card detection sensors 45, the insertion detection sensor 32 and the retreat detection sensor 90 are inputted to the control circuit 50. The control circuit 50 performs processing of reading and writing of data to the card 2 through the reading and writing circuit 51 and the magnetic head 43 and controls the conveyance motor 53 and the motor 64 provided in the card lock mechanism 6.

When some processing is to be performed on the card 2 in the card reader 1, the card 2 is taken into the inside of the main body part 4 and is conveyed along the conveyance passage 41 in the inside of the main body part 4 depending on contents of the processing. When reading and writing of data are to be performed on the card 2 through the magnetic head 43, it is required that the card 2 is being conveyed. The control circuit 50 drives the conveyance motor 52 according to a predetermined processing sequence to move the card 2 in the inside of the card reader 1. However, there may be occurred that the contents of driving the conveyance motor 52 and actually detected results from the card detection sensors 45 and the card insertion sensor 32 are contradicted each other. For example, a case may occur that, although the conveyance motor 52 is driven so that the card 2 is moved to a front side along the conveyance passage 41, the card 2 is detected by the card detection sensor 45 on a rear side, but the card 2 is not detected by the card detection sensor 45 on a front side. In such a case, it may be determined that a jam of the card 2 has occurred in the conveyance passage 41. A jam of the card 2 may be determined by providing a dedicated sensor for detecting a jam of the card 2 and by using a detection output from the dedicated sensor without using outputs of the card detection sensors 45. When the control circuit 50 has determined that a jam of the card 2 has occurred, the control circuit 50 drives the motor 64 to move the lock member 65 to the contact position. As a result, a movement of the card 2 is prevented by the lock member 65 and the card 2 is prevented from being illegally pulled out through the insertion port 31.

After the control circuit 50 has moved the lock member 65 to the contact position, when a command from a host apparatus or the like is inputted, the control circuit 50 drives the motor 46 to move the lock member 65 to the retreated position. Further, even in a case that a command is not inputted, when an operator rotates the knob 71 of the card lock mechanism 6 with a finger, the lock member 65 is able to be returned to the retreated position. However, in a case that the lock member 65 is going to be returned to the retreated position by rotating the knob 7 with a finger, when the knob 71 is excessively rotated, the lock member 65, the motor 64 and, in addition, the drive transmission mechanism 66 may be damaged. Therefore, in the card reader 1 in this embodiment, in order to prevent excessive rotation of the knob 71, when excessive rotation of the knob 71 is about to occur at a time when an operator turns the knob 71, the control circuit 50 drives the motor 64 to give a tactile signal to the operator through the knob 71 for calling attention of the operator. More specifically, after the control circuit 50 has driven the motor 64 to move the lock member 65 to the contact position, when the retreat detection sensor 90 detects that the lock member 65 has moved to the retreated position although a command is not inputted from a host apparatus or the like, the control circuit 50 executes a tactile stimulation sequence in which the motor 64 is driven so as to generate vibration in the knob 71 or slowly rotate the knob 71.

Regarding a rotation direction of the motor 64, a rotation direction where the lock member 65 is moved toward the contact position is defined as a normal direction, and a rotation direction where the lock member 65 is moved toward the retreated position is defined as a reverse direction. As a specific tactile stimulation sequence, one example is that the motor 64 is driven by a predetermined angle in the normal direction and, after that, the motor 64 is driven by the same angle in the reverse direction. In a case that the motor 64 is a stepping motor, it may be configured that the motor 64 is driven by one or several steps in the normal direction, and successively, the motor 64 is driven by the same step(s) in the reverse direction. When such the tactile stimulation sequence is executed, the knob 71 is alternately rotated only a minute angle in the normal direction and the reverse direction, in other words, the knob 71 is vibrated. The vibration of the knob 71 is able to be recognized by an operator who operates the knob 71 with a finger through a tactile sense and thus, the operator is alerted to excessive rotation of the knob 71. Another tactile stimulation sequence is that the motor 64 is rotated in the normal direction at a rotational speed lower than a rotational speed when the lock member 65 is actually moved to the contact position. Such rotation of the knob 71 is also recognized by a tactile sense of an operator. In this case, the reason why the rotational speed is set to be low is for securing safety of an operator. In addition, it may be configured that the above-mentioned vibration and low speed rotation in the normal direction are combined so that vibration is generated by only a certain constant time and then, the motor 64 is rotated at a low speed in the normal direction by only another constant time, and they are repeated. The tactile stimulation sequence is not limited to the examples described above and an arbitrary tactile stimulation sequence may be utilized in which the motor 64 is driven so that the knob 71 is moved so that an operator is capable of recognizing the movement in a tactile sense.

Figure 7:
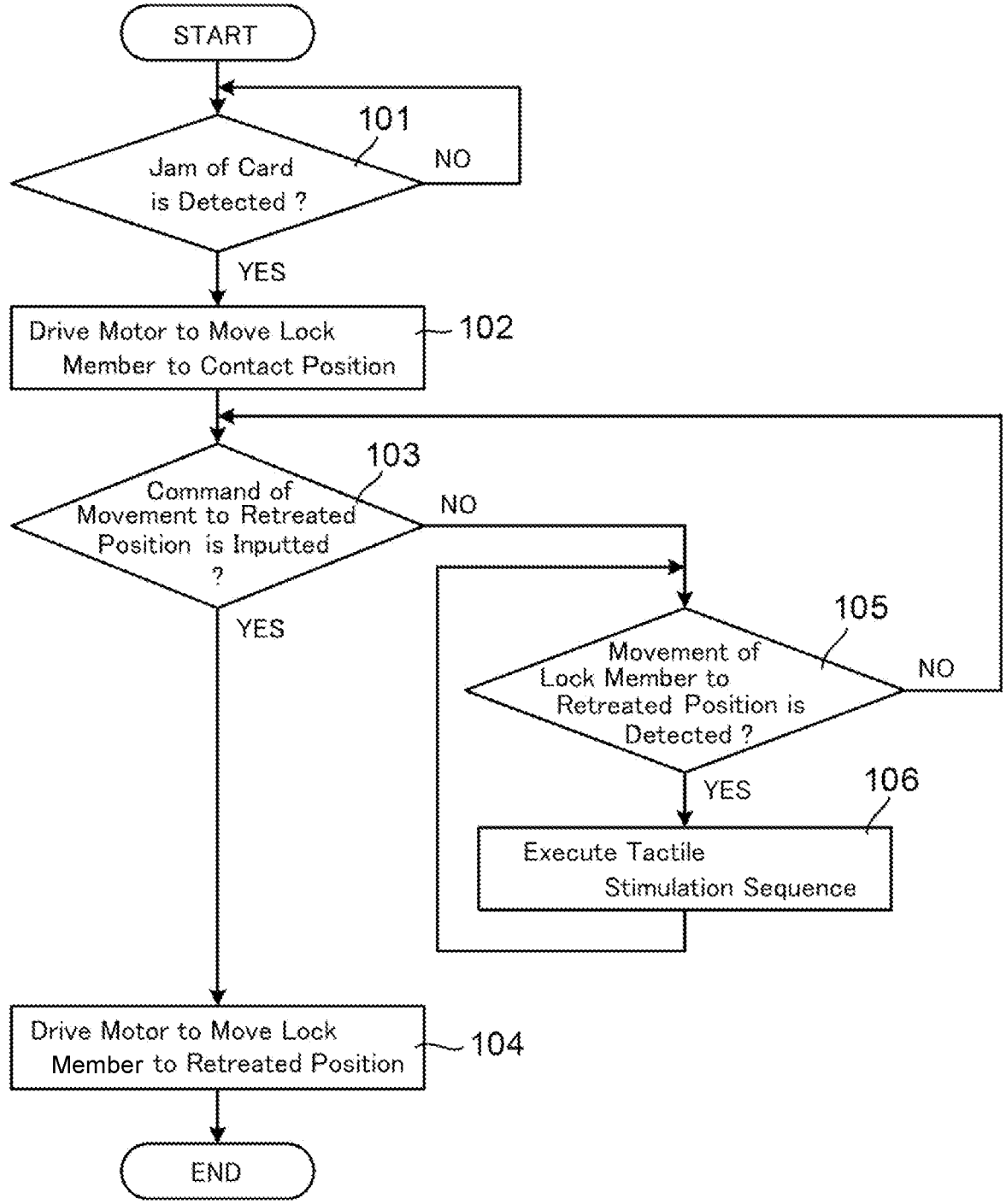
FIG. 7 is a flow chart showing an operation of a card reader.

FIG. 7 is a flow chart showing an operation of the card reader 1 and shows processing which is executed by the control circuit 50 in relation to the lock member 65. In an initial state, the lock member 65 is located at the retreated position and the card 2 is capable of being inserted into the card reader 1 through the insertion port 31, and the card 2 is able to be ejected from the card reader 1. The control circuit 50 determines in the step 101 whether or not a jam of the card 2 has occurred in the conveyance passage 41 based on a driving state of the conveyance motor 52 and detection outputs of the card detection sensors 45 and the insertion detection sensor 32. When occurrence of a jam of the card 2 is not detected, processing of the step 101 is repeated. On the other hand, when a jam of the card 2 is detected, in the step 102, the control circuit 50 drives the motor 64 to move the lock member 65 to the contact position and, after that, in the step 103, the control circuit 50 determines presence or absence of an input of a command from a host apparatus for moving the lock member 65 to the retreated position. When the command from the host apparatus is inputted, in the step 104, the control circuit 50 drives the motor 64 to move the lock member 65 to the retreated position, and a series of the processing is finished.

In the step 103, in a case that a command is not inputted from the host apparatus, the control circuit 50 determines whether the retreat detection sensor 90 detects that the lock member 65 has moved to the retreated position or not in the step 105. When a movement of the lock member 65 to the retreated position is not detected, the control circuit 50 repeats the processing of the steps 103 and 105. On the other hand, in a case that a movement of the lock member 65 to the retreated position is detected in the step 105, the control circuit 50 executes the above-mentioned tactile stimulation sequence and repeats the processing of the steps 105 and 106. As a result, when the knob 71 is operated by an operator with a finger and the lock member 65 has moved to the retreated position, the tactile stimulation sequence is continuously executed and thus, attention of the operator is called to excessive rotation of the knob 71. As described above, the control circuit 50 is, for example, configured of a microprocessor and thus, the above-mentioned processing is able to be realized by firmware in the card reader 1.

According to the above-mentioned card reader 1 in this embodiment, when the knob 71 mechanically connected with the rotation shaft 64a of the motor 64 in the card lock mechanism 6 is operated by an operator and thereby, a lock state (state that the lock member 65 is located at the contact position) of the card 2 is released, attention of the operator is called to excessive rotation of the knob 71 by executing the tactile stimulation sequence which makes the knob 71 move on purpose and thus, damage of the card lock mechanism 6 including the lock member 65 and the motor 64 due to excessive rotation of the knob 71 is able to be prevented.

According to an exemplary embodiment of the disclosure, there may be provided a card reader including an insertion port where a card is inserted and ejected, a conveyance passage where the card inserted from the insertion port is conveyed, and a card lock mechanism structured to prevent pulling-out of the card from the insertion port when the card is jammed in the conveyance passage. The card lock mechanism includes a motor, a lock member which is provided with a blocking pawl structured to contact with the card and prevent pulling-out of the card and is driven by the motor to be moved between a contact position where the blocking pawl is contacted with the card and a retreated position where the blocking pawl is retreated from the conveyance passage, a knob mechanically connected with an output shaft of the motor, and a detection mechanism structured to detect the lock member located at the retreated position. The card reader includes a control part which controls a position of the lock member by driving the motor, and the control part is configured so that, after the control part performs first control in which the motor is driven to move the lock member to the contact position, when the detection mechanism detects that the lock member has moved to the retreated position, the control part executes a tactile stimulation sequence in which the motor is driven to apply movement to the knob so that attention of an operator operating the knob is called in a tactile manner.

In the card reader in this embodiment of the disclosure, after the lock member of the card lock mechanism is controlled to be moved to the contact position, in a case that it is detected that the lock member has moved to the retreated position by an operator operating the knob with a finger, a tactile stimulation sequence which applies movement to the knob is executed and, as a result, the operator is capable of recognizing that an allowable range of rotation of the knob approaches its limit and thus, damage of the lock member and the motor caused by excessive rotation of the knob is able to be prevented.

In the card reader in accordance with at least an embodiment of the disclosure, the tactile stimulation sequence includes, for example, a sequence of repeating that the motor is rotated in a normal direction by a predetermined angle and then, the motor is rotated in a reverse direction by the predetermined angle. According to the tactile stimulation sequence, the knob is vibrated and thus, the operator is capable of surely recognizing the tactile stimulation sequence. Further, in this case, when the motor is structured of a stepping motor, the motor is able to be controlled so as to be repeatedly rotated in a normal direction and a reverse direction by a predetermined number of steps and thus, the control for executing the tactile stimulation sequence is able to be easily performed.

In the card reader in accordance with at least an embodiment of the disclosure, the tactile stimulation sequence may include a sequence of rotating the motor in a direction moving the lock member toward the contact position at a speed slower than a rotational speed of the motor in the first control. According to this tactile stimulation sequence, the lock member is slowly moved toward the contact position and thus, excessive rotation of the knob is able to be surely prevented.

In the card reader in accordance with at least an embodiment of the disclosure, the detection mechanism may include a shading member moved in conjunction with the lock member, and a sensor whose optical path is shaded by the shading member. According to this detection mechanism, the lock member located at the retreated position is able to be surely detected with a simple structure.

In the card reader in accordance with at least an embodiment of the disclosure, it is preferable that the first control is executed when a jam of the card in the conveyance passage is detected. As a result, an act of so-called fishing is able to be prevented.

According to another exemplary embodiment of the disclosure, there may be provided a control method for a card reader. The card reader includes an insertion port where a card is inserted and ejected, a conveyance passage where the card inserted from the insertion port is conveyed, and a card lock mechanism structured to prevent pulling-out of the card from the insertion port when the card is jammed in the conveyance passage. The card lock mechanism includes a motor, a lock member which is provided with a blocking pawl structured to contact with the card and prevent pulling-out of the card and is driven by the motor to be moved between a contact position where the blocking pawl is contacted with the card and a retreated position where the blocking pawl is retreated from the conveyance passage, and a knob mechanically connected with an output shaft of the motor. The control method includes performing first control in which the motor is driven so that the lock member is moved to the contact position and, after that, when it is detected that the lock member has moved to the retreated position, executing a tactile stimulation sequence in which movement is applied to the knob by driving the motor to call attention of an operator operating the knob in a tactile manner.

In the control method in this embodiment of the disclosure, after the lock member of the card lock mechanism is controlled to be moved to the contact position, in a case that it is detected that the lock member has moved to the retreated position by an operator operating the knob with a finger, a tactile stimulation sequence which applies movement to the knob is executed and, as a result, the operator is capable of recognizing that an allowable range of rotation of the knob approaches its limit and thus, damage of the lock member and the motor caused by excessive rotation of the knob is able to be prevented.

In the control method in accordance with at least an embodiment of the disclosure, the tactile stimulation sequence includes, for example, a sequence of repeating that the motor is rotated in a normal direction by a predetermined angle and then, the motor is rotated in a reverse direction by the predetermined angle. According to the tactile stimulation sequence, the knob is vibrated and thus, the operator is capable of surely recognizing the tactile stimulation sequence.

In the control method in accordance with at least an embodiment of the disclosure, the tactile stimulation sequence may include a sequence of rotating the motor in a direction moving the lock member toward the contact position at a speed slower than a rotational speed of the motor in the first control. According to this tactile stimulation sequence, the lock member is slowly moved toward the contact position and thus, excessive rotation of the knob is able to be surely prevented.

In the control method in accordance with at least an embodiment of the disclosure, it is preferable that the first control is executed when a jam of the card in the conveyance passage is detected. As a result, an act of so-called fishing is able to be prevented.

According to the disclosure, in a card reader which includes a card lock mechanism having a lock member driven by a motor and is structured so that a lock state of a card by the lock member is capable of being manually released by rotating a knob, damage of the lock member and the motor caused by excessive rotation of the knob is able to be prevented.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A card reader comprising:
   an insertion port where a card is inserted and ejected;
   a conveyance passage where the card inserted from the insertion port is conveyed; and
   a card lock mechanism structured to prevent pulling-out of the card from the insertion port when the card is jammed in the conveyance passage;
   wherein the card lock mechanism comprises:
      a motor;
      a lock member which is provided with a blocking pawl structured to contact with the card and prevent pulling-out of the card and is driven by the motor to be moved between a contact position where the blocking pawl is contacted with the card and a retreated position where the blocking pawl is retreated from the conveyance passage;
      a knob mechanically connected with an output shaft of the motor; and
      a detection mechanism structured to detect the lock member located at the retreated position;
   wherein the card reader comprises a control part which controls a position of the lock member by driving the motor; and
   wherein the control part is configured so that, after the control part performs first control in which the motor is driven to move the lock member to the contact position, when the detection mechanism detects that the lock member has moved to the retreated position, the control part executes a tactile stimulation sequence in which the motor is driven to apply movement to the knob so that attention of an operator operating the knob is called in a tactile manner.

2. The card reader according to claim 1, wherein the tactile stimulation sequence comprises repeating that the motor is rotated in a normal direction by a predetermined angle and then, the motor is rotated in a reverse direction by the predetermined angle.

3. The card reader according to claim 2, wherein the motor is a stepping motor.

4. The card reader according to claim 1, wherein the tactile stimulation sequence comprises rotating the motor in a direction moving the lock member toward the contact position at a speed slower than a rotational speed of the motor in the first control.

5. The card reader according to claim 1, wherein the detection mechanism comprises a shading member moved in conjunction with the lock member, and a sensor whose optical path is shaded by the shading member.

6. The card reader according to claim 1, wherein the control part executes the first control when a jam of the card in the conveyance passage is detected.

7. A control method for a card reader, the card reader comprising:
   an insertion port where a card is inserted and ejected;
   a conveyance passage where the card inserted from the insertion port is conveyed; and
   a card lock mechanism structured to prevent pulling-out of the card from the insertion port when the card is jammed in the conveyance passage;
   wherein the card lock mechanism comprises:
      a motor;
      a lock member which is provided with a blocking pawl structured to contact with the card and prevent pulling-out of the card and is driven by the motor to be moved between a contact position where the blocking pawl is contacted with the card and a retreated position where the blocking pawl is retreated from the conveyance passage; and
      a knob mechanically connected with an output shaft of the motor;
   the control method comprising:
      performing first control in which the motor is driven so that the lock member is moved to the contact position; and
      after that, when it is detected that the lock member has moved to the retreated position, executing a tactile stimulation sequence in which movement is applied to the knob by driving the motor to call attention of an operator operating the knob in a tactile manner.

8. The control method according to claim 7, wherein the tactile stimulation sequence comprises repeating that the motor is rotated in a normal direction by a predetermined angle and then, the motor is rotated in a reverse direction by the predetermined angle.

9. The control method according to claim 7, wherein the tactile stimulation sequence comprises rotating the motor in a direction moving the lock member toward the contact position at a speed slower than a rotational speed of the motor in the first control.

10. The control method according to claim 7, wherein the first control is executed when a jam of the card in the conveyance passage is detected.

11. The control method according to claim 8, wherein the tactile stimulation sequence comprises rotating the motor in a direction moving the lock member toward the contact position at a speed slower than a rotational speed of the motor in the first control.

12. The control method according to claim 11, wherein the first control is executed when a jam of the card in the conveyance passage is detected.

13. The card reader according to claim 3, wherein the tactile stimulation sequence comprises rotating the motor in a direction moving the lock member toward the contact position at a speed slower than a rotational speed of the motor in the first control.

14. The card reader according to claim 13, wherein the detection mechanism comprises a shading member moved in conjunction with the lock member, and a sensor whose optical path is shaded by the shading member.

15. The card reader according to claim 14, wherein the control part executes the first control when a jam of the card in the conveyance passage is detected.

* * * * *